(12) United States Patent
Petrov (10) Patent No.: US 12,084,996 B2
(45) Date of Patent: Sep. 10, 2024

(54) OIL FILTER ARRANGEMENT FOR FILTERING OIL OF A VEHICLE

(71) Applicant: Volvo Car Corporation, Gothenburg (SE)

(72) Inventor: Peter Petrov, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/335,585

(22) Filed: Jun. 15, 2023

(65) Prior Publication Data

US 2023/0407774 A1 Dec. 21, 2023

(30) Foreign Application Priority Data

Jun. 17, 2022 (EP) ..................................... 22179703

(51) Int. Cl.
*F01M 11/03* (2006.01)
*F01M 1/02* (2006.01)

(52) U.S. Cl.
CPC .............. *F01M 11/03* (2013.01); *F01M 1/02* (2013.01); *F01M 2011/035* (2013.01)

(58) Field of Classification Search
CPC ..... F01M 2011/035; F01M 1/02; F01M 11/03
See application file for complete search history.

(56) References Cited

U.S. PATENT DOCUMENTS 4,370,957 A * 2/1983 Skatsche ................. F02B 77/14
123/196 R

FOREIGN PATENT DOCUMENTS

| DE | 102020112646 A1 | 3/2021 | |
| DE | 102020203449 A1 | 9/2021 | |
| DE | 102020203459 A1 | 9/2021 | |
| WO | WO-9612093 A1 * | 4/1996 | ............. F01M 5/002 |

OTHER PUBLICATIONS

Extended European Search Report received for European Patent Application No. 22179703.8 dated Dec. 12, 2022, 7 pages.

* cited by examiner

*Primary Examiner* — Kevin A Lathers
(74) *Attorney, Agent, or Firm* — Amin, Turocy & Watson, LLP (57) ABSTRACT

An oil filter arrangement for filtering oil of a vehicle can comprise: at least one filter unit for filtering the oil, and at least one connection unit comprising at least one inlet tube configured to be connected with an outlet tube of a separate oil pump, wherein the oil filter arrangement is configured to be housed in an oil filter arrangement housing of the vehicle.

20 Claims, 11 Drawing Sheets

OIL FILTER ARRANGEMENT FOR FILTERING OIL OF A VEHICLE

CROSS-REFERENCE TO RELATED APPLICATIONS

This application claims the benefit of and priority to pending EP patent application serial number 22179703.8, filed Jun. 17, 2022, and entitled "OIL FILTER ARRANGEMENT FOR FILTERING OIL OF A VEHICLE," the entirety of which is hereby incorporated by reference herein.

TECHNICAL FIELD

The present disclosure relates to an oil filter arrangement for filtering oil of a vehicle, an oil pump and oil filter arrangement for pumping and filtering oil of a vehicle, and a vehicle with such an arrangement.

BACKGROUND

Oil filter arrangements, filter arrangements, oil filter units, or filter units are configured to be attached to a housing of an engine, transmission, and/or, in particular, an electrical drive axle, whereby the oil filter arrangements, filter arrangements, oil filer units, or filter units are connected to the respective housing from the outside of the housing. The oil filter arrangement, filter arrangement, oil filter units, or filter unit is thereby connected to the respective housing by means of fixture features, fastening elements and/or threaded joints. Further, some oil filter units or filter units are integrated in the respective housing, whereby these oil filter units or filter units are not considered to be replaced, for example during a service.

SUMMARY

It is found that a further need exists to provide an improved oil filter arrangement for filtering oil of a vehicle.

In the view of the above, it is an object of the present disclosure to provide an improved oil filter arrangement for filtering oil of a vehicle.

The problem is at least partially solved or alleviated by the subject matter of the independent claims of the present disclosure, wherein further examples are incorporated in the dependent claims.

According to a first aspect, an oil filter arrangement for filtering oil of a vehicle is disclosed, comprising:
- at least one filter unit for filtering the oil; and
- at least one connection unit comprising at least one inlet tube configured to be connected with an outlet tube of a separate oil pump unit;
- whereby the oil filter arrangement is configured to be housed in an oil filter arrangement housing of the vehicle.

The at least one filter unit may be configured an oil filter unit which may for example be configured as a spin-on oil filter type or a cartridge oil filter type.

In other words, the oil filter arrangement may be housed in an existing housing and/or a special housing of the vehicle. Thereby, it may no longer be necessary to provide a special housing for a filter unit or to use a filter unit with an extra housing. This means that, for example, replacement of a housing for a filter unit may be avoided or saved, so that the disclosed oil filter arrangement may save consumption materials in the use and/or replacement of an oil filter arrangement.

In an implementation, the at least one connection unit may comprise at least one contact element configured to get in contact with at least one contact element of the separate oil pump unit.

In other words, the at least one connection unit may have dedicated contact pads, similarly to an oil pump may have dedicated contact pads, which may be configured to mate together during assembly to prevent the filter from moving out of position.

In an implementation, the at least one connection unit may comprise at least one guiding element configured to be housed in a recess of the vehicle corresponding to the at least one guiding element.

In other words, the at least one filter unit may be guided with a cylindrical portion, which may be arrangement at the bottom of the at least one filter unit and may be inserted into a corresponding hole of the oil filter arrangement housing.

Further, the guiding element may also be described as a notch that may be mated with a slot in the oil filter arrangement housing.

Furthermore, the guiding element may also be described as a protruding feature that may be located at the bottom of the at least one filter unit and center the at least one filter unit to a corresponding small hole at the bottom of the oil filter arrangement housing.

In an implementation, the at least one connection unit may comprise at least one rotational orientation element configured to be connected to at least one rotational orientation element of the vehicle to restrict a rotation of the oil filter arrangement about a longitudinal axis thereof.

In an implementation, the at least one connection unit may comprise at least one radial groove and at least one radial hole configured to transfer the oil from the at least one filter unit to the vehicle.

In other words, the at least one radial groove and the at least one radial hole may be configured to provide for outlet of oil from the at least one filter unit in a radial direction rather than an axial direction.

For example, one radial groove and two radial holes, preferably four radial holes, may be used to transmit the oil.

In an implementation, the at least one connection unit may comprise at least two or more sealing elements configured to seal a connection between the at least one connection unit and the oil filter arrangement housing of the vehicle.

In other words, the oil filter arrangement may be sealed against the oil filter arrangement housing by two sealing elements, and the oil filter arrangement may be located inside a wet environment and therefore leakage would not be critical.

Furthermore, at least two sealing elements may be utilized on the at least one connector assembly to seal the at least one connector assembly against the housing of the filter assembly to ensure a desired and/or optimal oil flow between the oil filter arrangement and the vehicle.

Further, the oil filter arrangement may be centered with the at least two sealing units inside the oil filter arrangement housing.

The sealing element may be an annular sealing element, for example, the annular sealing element may be an O-ring or a similar annular sealing element.

In an implementation, the oil of the vehicle may be pumped and/or pressed by the separate oil pump unit from the outlet pipe into the inlet pipe so that it may be transferred from the outside of the at least one filter unit to the inside of the at least one filter unit and from the inside of the at least one filter unit via the at least one radial hole sideways out of the at least one connection unit into the at least one radial groove and the oil filter arrangement housing.

In other words, the oil may be led out of a center tube of the at least one filter unit towards the oil filter arrangement housing.

In an implementation, the oil filter arrangement may be configured to be fixed in the oil filter arrangement housing by means of a force-locking connection with the separate oil pump.

In other words, the at least one oil filter may be held without any joints, such as screw joints.

In an implementation, the connection unit and the filter unit may be detachably connected with each other.

In addition, the oil filter arrangement may be configured to separately replace the at least one connection unit and/or the at least one filter unit with respect to each other.

A further aspect of the present disclosure relates to an oil pump and oil filter arrangement for pumping and filtering oil of a vehicle, comprising:
- a disclosed oil filter arrangement for filtering the oil; and
- an oil pump unit for pumping the oil comprising an outlet tube;
- whereby the oil filter arrangement and the oil pump unit are connected to each other to transfer the oil between the oil pump unit and the oil filter arrangement at least from the outlet tube to the inlet tube;
- whereby the oil filter arrangement is configured to be housed in an oil filter arrangement housing of the vehicle.

Therefore, the advantage may be that the oil pump and oil filter arrangement may be configured to be housed in the oil filter arrangement housing of the vehicle which may improve the installation of the oil pump and the oil filter arrangement, especially the installation of the oil filter arrangement in such a way that it may be installed without fasteners and without a sealing interface to the outside environment. In this case, the oil pump unit may provide the sealing to the outer environment, while the oil filter arrangement is sealed with at least two sealing elements against the oil filter arrangement housing, so that even a leak from the oil filter arrangement may not be critical since it is in the oil filter arrangement housing, where a wet or humid environment may be.

In an implementation, the oil pump and oil filter arrangement may comprise an oil strainer unit be configured to filter the oil transferred between the vehicle and the oil pump unit.

In an implementation, the oil filter arrangement and the oil pump unit may be arranged coaxially to each other.

In other words, the oil filter arrangement and the oil pump unit may be positioned coaxially to each other.

In an implementation, the oil pump unit may comprise at least one contact element which may be configured to be in contact with at least one contact element of the at least one connection unit.

In other words, to lock the oil filter arrangement, the oil pump unit will get in touch with the oil filter arrangement when the oil pump unit being assembled. The oil filter arrangement and the oil pump may be contacted with each other by means of respective contact pads.

Further, after insertion into the oil filter arrangement housing, the oil filter arrangement may have only one degree of freedom of movement in the axial direction, and the degree of freedom of movement may be restricted by the oil pump unit.

A further aspect of the present disclosure relates to a vehicle with an oil pump and/or an oil filter arrangement, whereby at least the oil filter of the arrangement is housed in an oil filter arrangement housing of the vehicle. The oil pump and oil filter arrangement may be housed in a housing of the vehicle.

This may provide the advantage that the oil filter arrangement does not have to be held in place by a fixing feature, but rather by the oil pump unit. This also allows that some oil channels in the housing of the vehicle may be skipped.

Therefore, the oil pump unit may be installed after the oil filter arrangement. Thereby, the oil filter arrangement may be in a centered and/or in a fixed rotational position in the oil filter arrangement housing. In this case, the position of the oil filter arrangement may be correctly held in position by, for example, holes and projections.

In an implementation, the oil filter arrangement housing may be provided in at least one axle, at least one engine housing and/or at least one transmission housing of the vehicle.

The at least one axle may be an electric axle of the vehicle, preferably the at least one axle may be an electric drive axle of the vehicle. The electric axle and/or the electric drive axle of the vehicle may comprise at least some components for electrically driving the vehicle, whereby the electric drive axle may comprise all components for electrically driving the vehicle.

Further, the at least one engine housing and/or the at least one transmission housing may comprise a flange for connecting the oil pump to the at least one engine housing, the at least one transmission housing and/or the at least one axle of the vehicle.

The oil filter arrangement housing may be in an oil sump.

BRIEF DESCRIPTION OF DRAWINGS

In the following, the disclosure is described exemplarily with reference to the enclosed figures, in which:

FIG. 4b is a schematic illustration of an example of a connection unit according to FIG. 3a;

FIG. 4d is a schematic illustration of an example of an oil flow of a connection unit with an oil pump unit and a housing of a vehicle according to FIG. 4a;

DETAILED DESCRIPTION

Notably, the figures are merely schematic representations and serve only to illustrate examples of the present disclosure. Identical or equivalent elements are in principle provided with the same reference signs.

Figure 1:
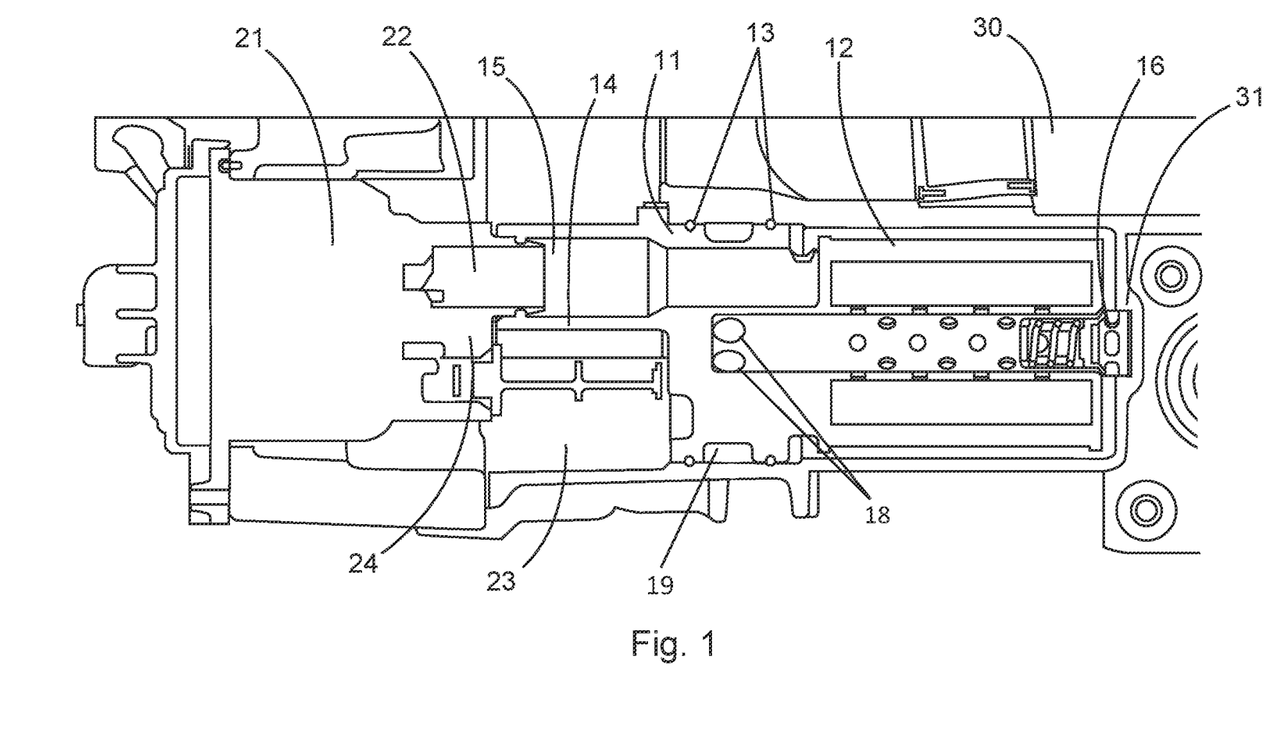
FIG. 1 is a schematic illustration of an example of a disclosed oil pump and oil filter arrangement housed in an oil filter arrangement housing of the vehicle.

FIG. 1 shows a schematic illustration of an example of a disclosed oil pump and oil filter arrangement housed in an oil filter arrangement housing, whereby the oil pump and oil filter arrangement can comprise an oil filter arrangement for filtering oil of a vehicle. The oil filter arrangement can comprise a filter unit 12 for filtering the oil and a connection unit 11. The connection unit 11 can comprise at least one inlet tube 15 configured to be connected with an outlet tube 22 of an oil pump unit 21. And the oil filter arrangement is connected to the oil pump unit 21 to transfer the oil between the oil pump unit 21 and the oil filter arrangement at least from the outlet tube 22 to the inlet tube 15. The oil pump and oil filter arrangement is configured to be housed in an oil filter arrangement housing of a housing 30 of the vehicle.

The connection unit 11 can further comprise a contact element 14 contacted with a contact element 24 of the oil pump unit 21.

The filter unit 12 can further comprise a guiding element 16 configured to be housed in a recess 31 of the housing 30 of the vehicle corresponding to the guiding element 16.

The connection unit 11 can further comprise one radial groove 19 and, for example, two radial holes 18, preferably four radial holes may be used in other implementations, configured to transfer the oil from the filter unit 12 to the oil filter arrangement housing of the housing 30 of the vehicle.

The connection unit 11 can further comprise two sealing elements 13 configured to seal a connection between the connection unit 11 and the oil filter arrangement housing of the housing 30 of the vehicle.

The oil pump and oil filter arrangement can further comprise an oil strainer unit 23 configured to filter the oil transferred between the vehicle and the oil pump unit 21.

Further, the oil filter arrangement and the oil pump unit 21 are arranged coaxially to each other.

Figure 2:
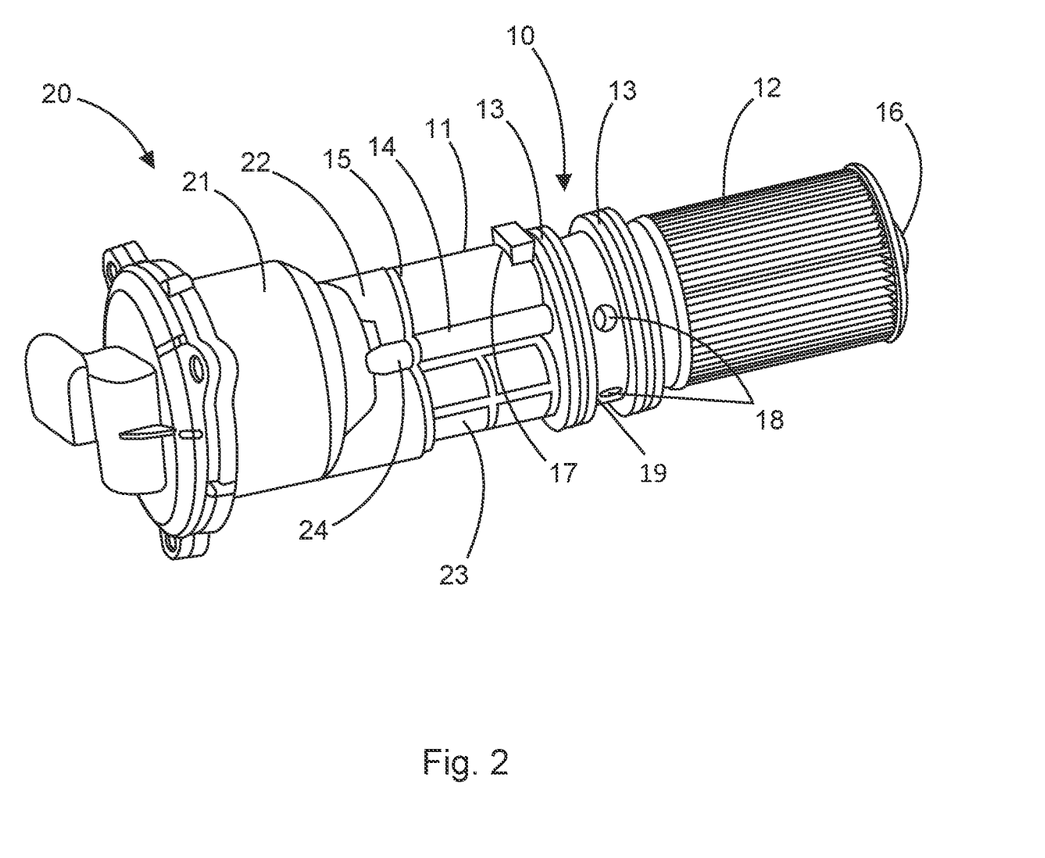
FIG. 2 is a schematic illustration of an example of a disclosed oil pump and oil filter arrangement.

FIG. 2 shows a schematic illustration of an example of a disclosed oil pump and oil filter arrangement 20, whereby the oil pump and oil filter arrangement 20 can comprise an oil filter arrangement 10 for filtering oil of a vehicle. The oil filter arrangement 10 can comprise a filter unit 12 for filtering the oil and a connection unit 11. The connection unit 11 can comprise at least one inlet tube 15 configured to be connected with an outlet tube 22 of an oil pump unit 21. And the oil filter arrangement 10 and the oil pump unit 21 are connected to each other to transfer the oil between the oil pump unit 21 and the oil filter arrangement 10 at least from the outlet tube 22 to the inlet tube 15.

The connection unit 11 can further comprise a contact element 14 contacted with a contact element 24 of the oil pump unit 21.

The filter unit 12 can further comprise a guiding element 16 configured to be housed in a recess of the housing of the vehicle corresponding to the guiding element 16.

The connection unit 11 can comprise a rotational orientation element 17 configured to be connected to at least one rotational orientation element of a housing of the vehicle to restrict a rotation of the oil filter arrangement 10 about a longitudinal axis thereof.

The connection unit 11 can further comprise two sealing elements 13 configured to seal a connection between the connection unit 11 and the oil filter arrangement housing of the housing of the vehicle.

The oil pump and oil filter arrangement can further comprise an oil strainer unit 23 configured to filter the oil transferred between the vehicle and the oil pump unit 21.

Further, the oil filter arrangement 10 and the oil pump unit 21 are arranged coaxially to each other.

Figure 3A:
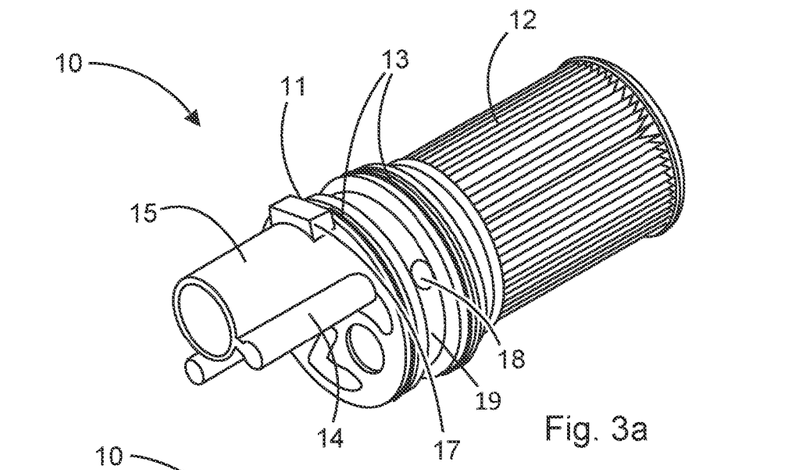
FIG. 3a is a schematic illustration of an example of a disclosed oil filter arrangement in a first view.
Figure 3B:
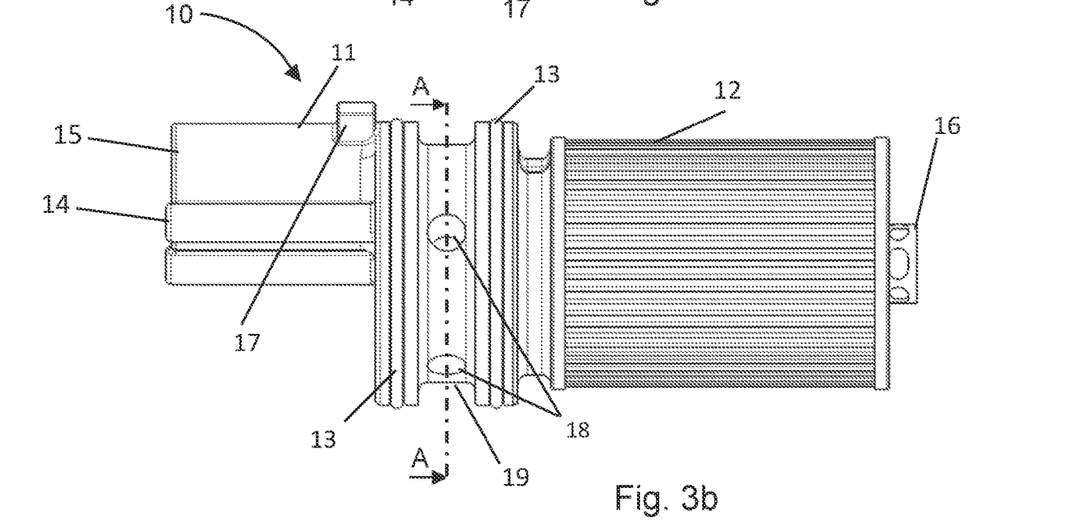
FIG. 3b is a schematic illustration of an example of a disclosed oil filter arrangement in a second view.

FIG. 3a and FIG. 3b show a schematic illustration of an example of a disclosed oil filter arrangement 10 in a first and second view, whereby the oil filter arrangement 10 for filtering oil of a vehicle can comprise a filter unit 12 for filtering the oil and at least one connection unit 11 can comprise at least one inlet tube 15 configured to be connected with an outlet tube of a separate oil pump unit.

The connection unit 11 can further comprise a contact element 14 configured to be contacted with a contact element of the separate oil pump unit.

The connection unit 11 can comprise a rotational orientation element 17 configured to be connected to at least one rotational orientation element of a housing of the vehicle to restrict a rotation of the oil filter arrangement 10 about a longitudinal axis thereof.

The connection unit 11 can further comprise two sealing elements 13 configured to seal a connection between the connection unit 11 and the oil filter arrangement housing of the housing of the vehicle.

The connection unit 11 can further comprise one radial groove 19 and radial holes 18 configured to transfer the oil from a filter unit 12 to the housing of the vehicle.

FIG. 3b, in particular, shows the filter unit 12 with a guiding element 16 configured to be housed in a recess of the housing of the vehicle corresponding to the guiding element 16.

Figure 3C:
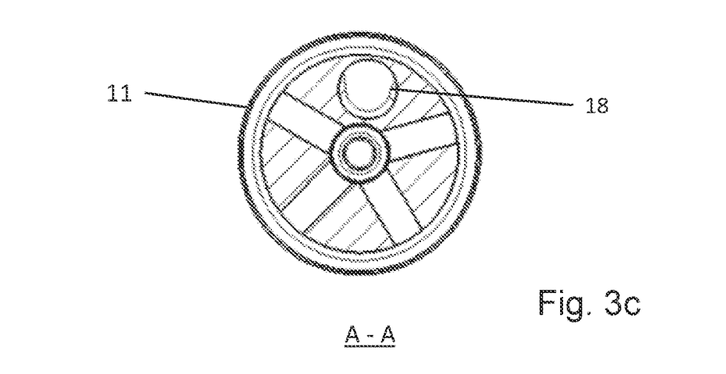
FIG. 3c is a schematic illustration of an example of a disclosed oil filter arrangement in a third view.

FIG. 3c shows a cross-sectional view along the cross-section A-A shown in FIG. 3b, showing how a radial hole 18 is configured inside the connection unit 11.

Figure 4A:
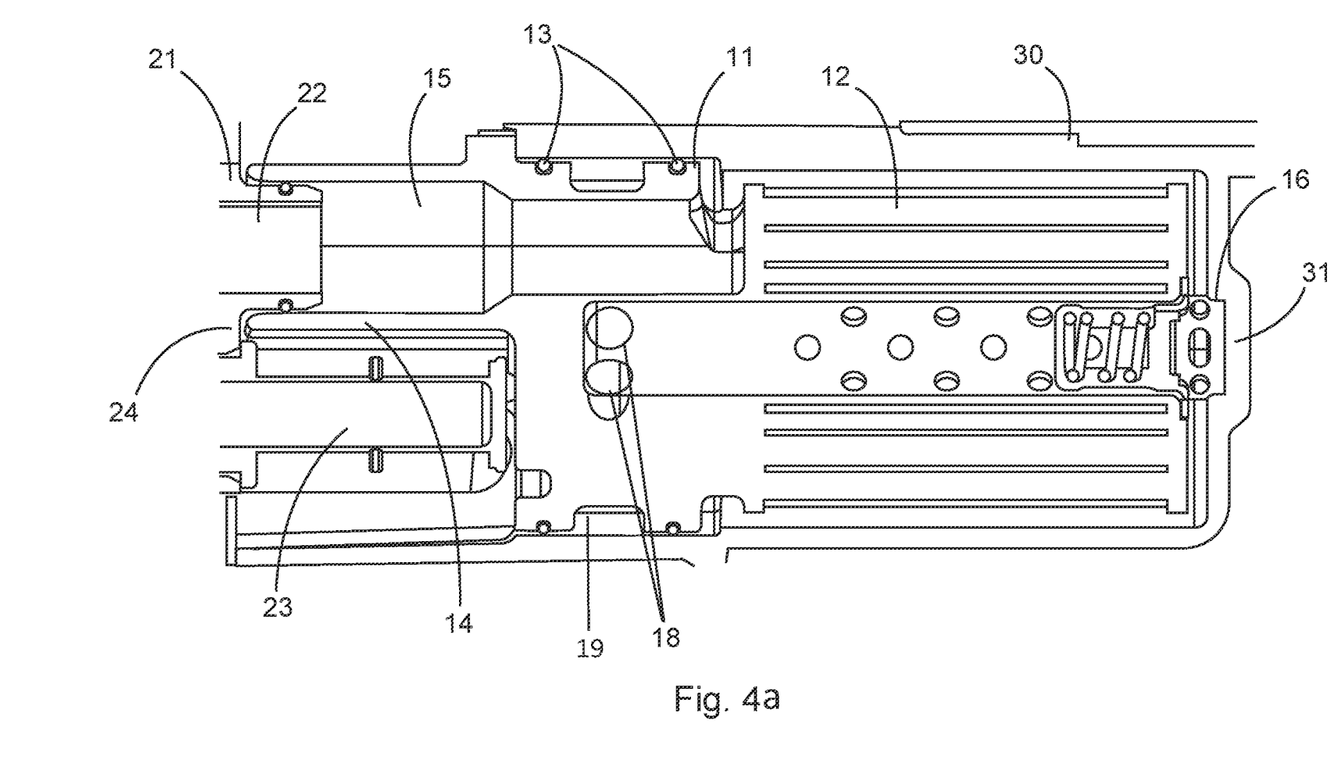
FIG. 4a is a schematic illustration of an example of an oil flow of a disclosed oil filter arrangement with an oil pump unit according to FIG. 1.

FIG. 4a shows a schematic illustration of an example of an oil flow of a disclosed oil filter arrangement with an oil pump unit 21 according to FIG. 1, whereby the oil of the vehicle is pumped and/or pressed by an oil pump unit 21 from an outlet pipe 22 of the oil pump unit 21 into an inlet pipe 15 of the oil filter arrangement so that it is transferred from the outside of the filter unit 12 to the inside of the filter unit 12 and from the inside of the filter unit 12 via radial groove holes 18 sideways out of the one connection unit 11 into the at least one radial groove 19 and the oil filter arrangement housing of a housing 30 of a vehicle.

In other words, the oil is pumped and/or pressed out from the outlet pipe 22 of the oil pump unit 21. The outlet pipe 22 of the oil pump unit is inserted into the inlet pipe 15 of the connection unit 11 where both may be sealed by an O-ring. When oil fills up the volume, it is forced to penetrate through the filtering elements of the filter unit 12 and enter the center tube of the filter unit 12. From the center tube, oil flows via the radial holes 18 positioned at the front end of the center tube. The radial holes are in connection with a radial groove 19 provided on the outer surface of the connection unit 11.

When oil fills up the radial groove 19, it continues to flow up through a drilled oil channel in the motor housing. The radial groove 19 is sealed towards the motor housing by means of two O-rings.

Figure 4B:
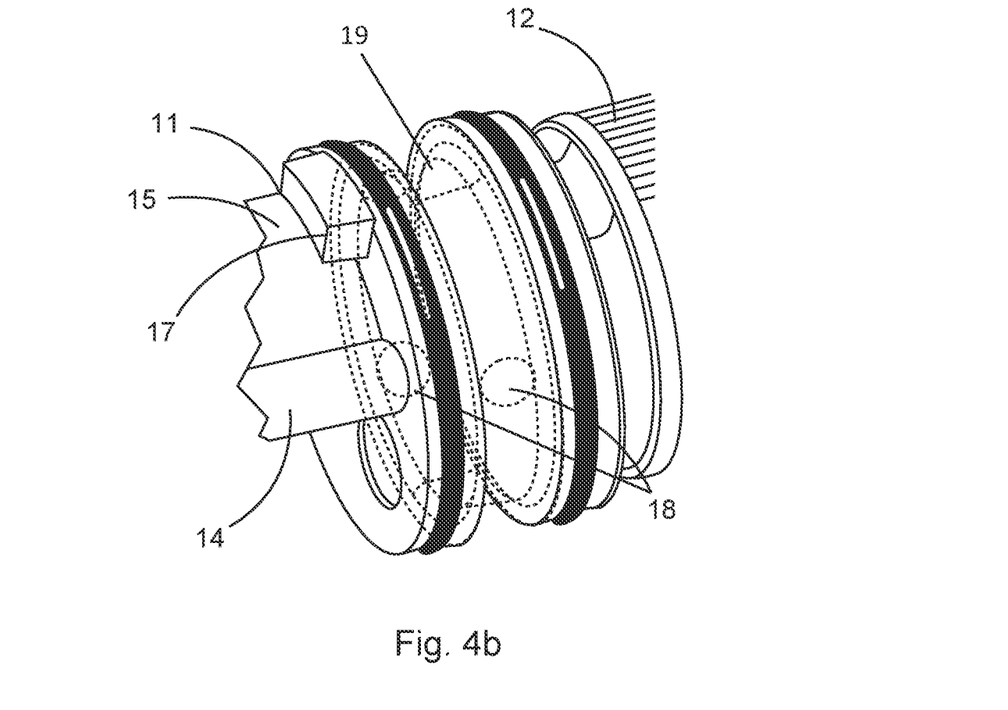

FIG. 4b shows a schematic illustration of an example of a connection unit 11 according to FIG. 3a, whereby the radial grove 19 can comprise radial holes 18 which are configured to lead the oil sideways out of the connection unit 11, whereby the oil is pumped and/or pressed from the inside of the filter unit 12 via the radial holes 18 into the radial grove 19.

Figure 4C:
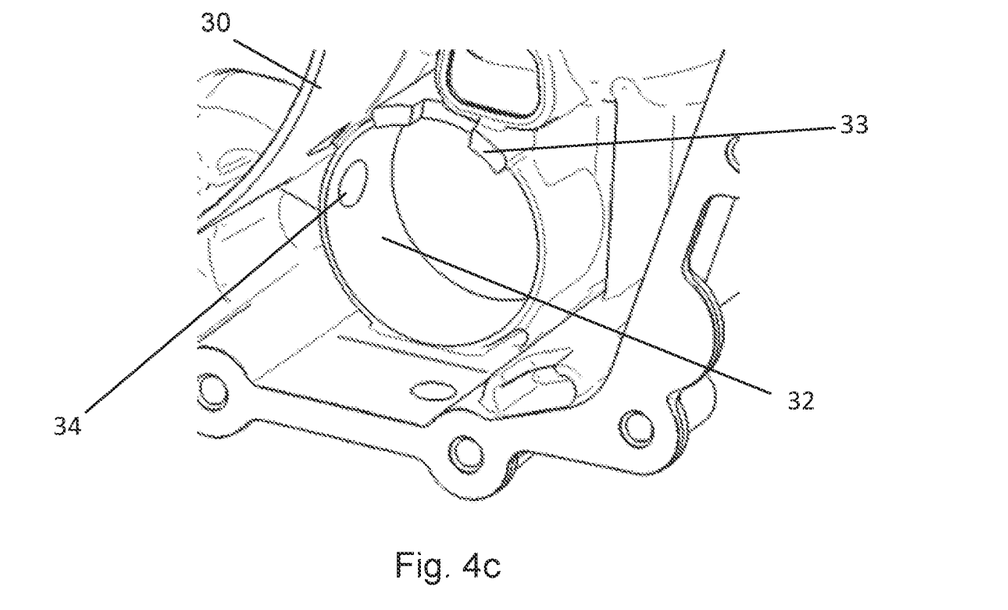
FIG. 4c is a schematic illustration of an example of a housing of a vehicle.

FIG. 4c shows a schematic illustration of an example of a housing 30 of a vehicle, whereby the housing comprises the oil filter arrangement housing 32 which is configured to lead the oil from the oil filter arrangement housing 32 to the vehicle via a hole and/or channel 34 in the housing 32. Further, the housing 30 comprises a rotational orientation element of the vehicle 33 which is configured to connect to a rotational orientation element of a connection unit of an oil filter arrangement.

Figure 4D:
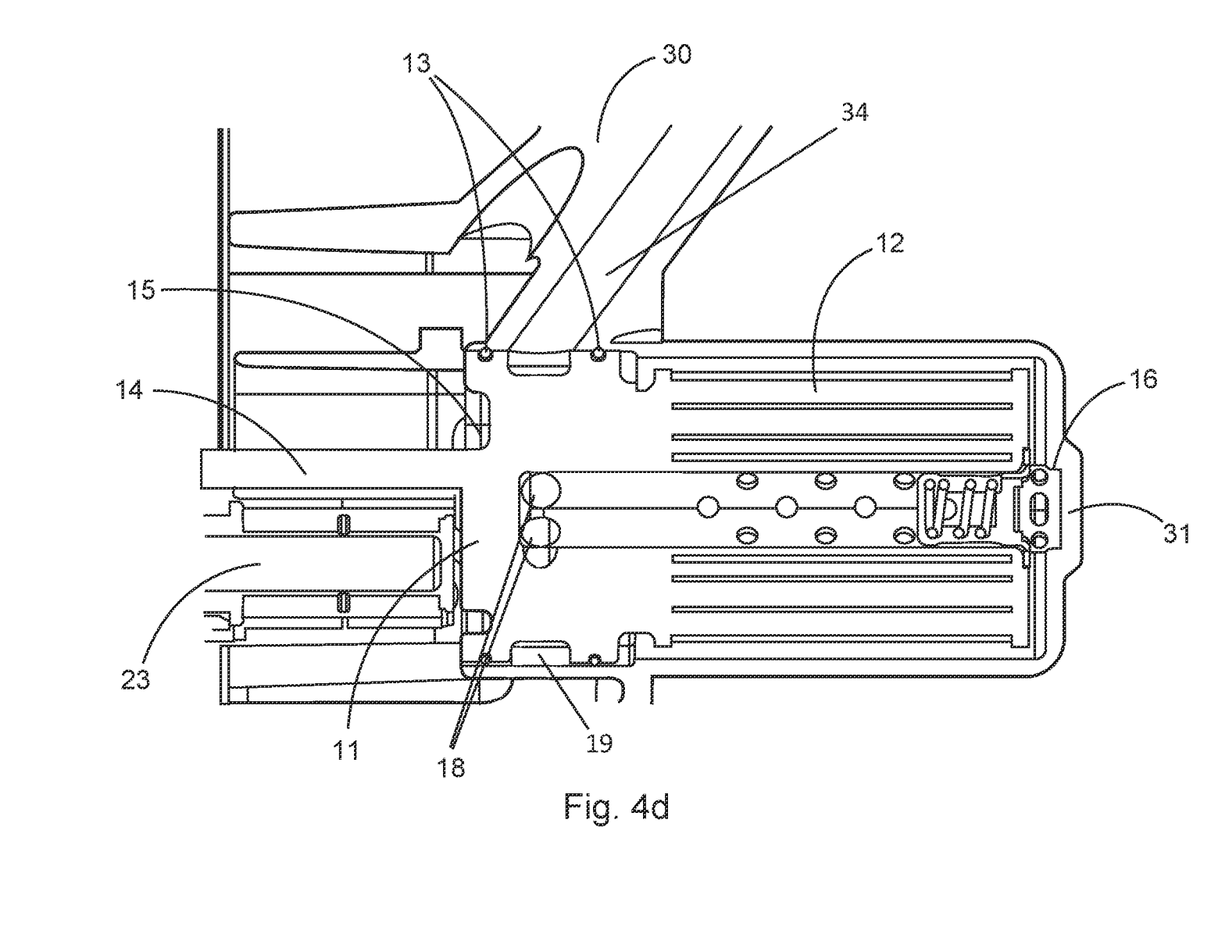

FIG. 4d shows a schematic illustration of an example of an oil flow of a connection unit 11 with an oil pump and a housing 30 of a vehicle according to FIG. 4a, whereby the oil is led from the filter unit 12 over the radial holes 18 into the radial groove 19. Further the oil is pumped and/or pressed from the radial groove 19 into a hole and/or channel 34 of the housing 30.

Figure 5A:
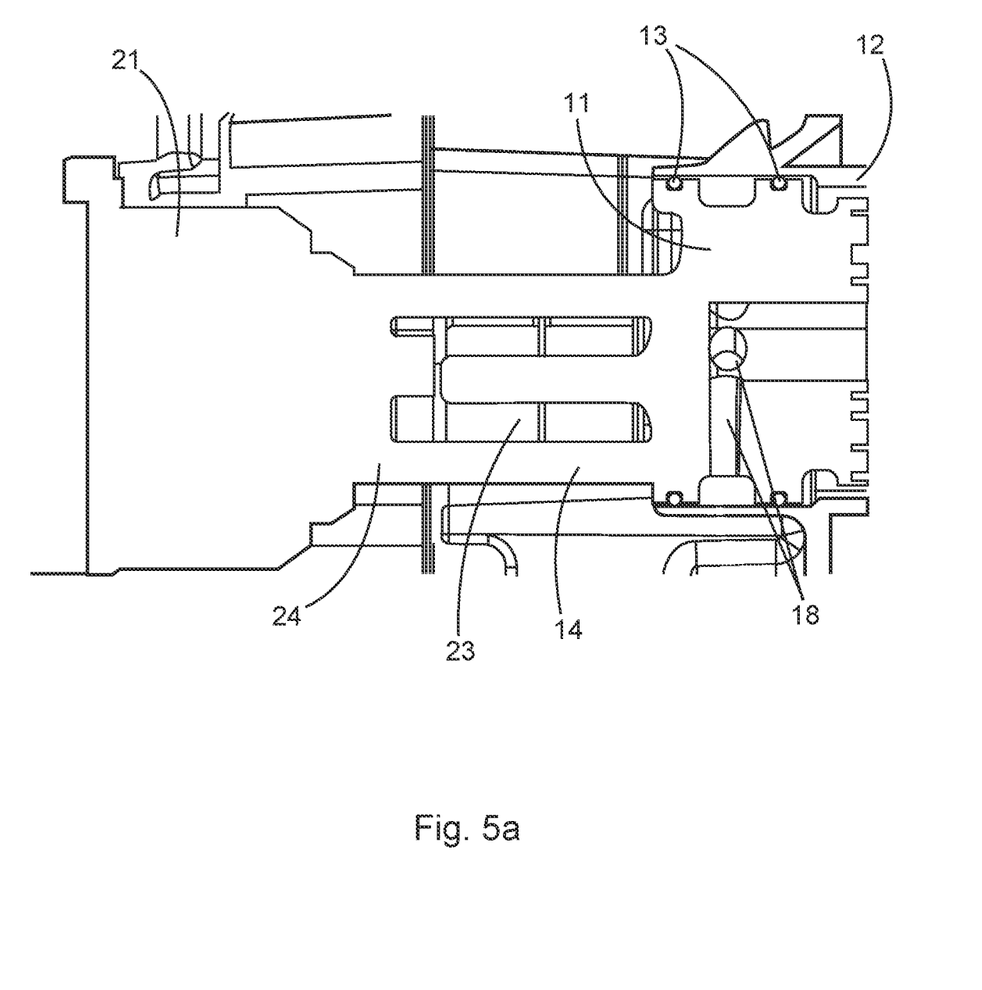
FIG. 5a is a schematic illustration of an example of a connection between a connection unit and an oil pump unit according to FIG. 1.

FIG. 5a shows a schematic illustration of an example of a connection between a connection unit 11 and an oil pump unit 21 according to FIG. 1, whereby a first and a second contact pad element 14 of the connection unit 11 are connected to a first and a second contact pad element 24 of the oil pump unit 21.

Figure 5B:
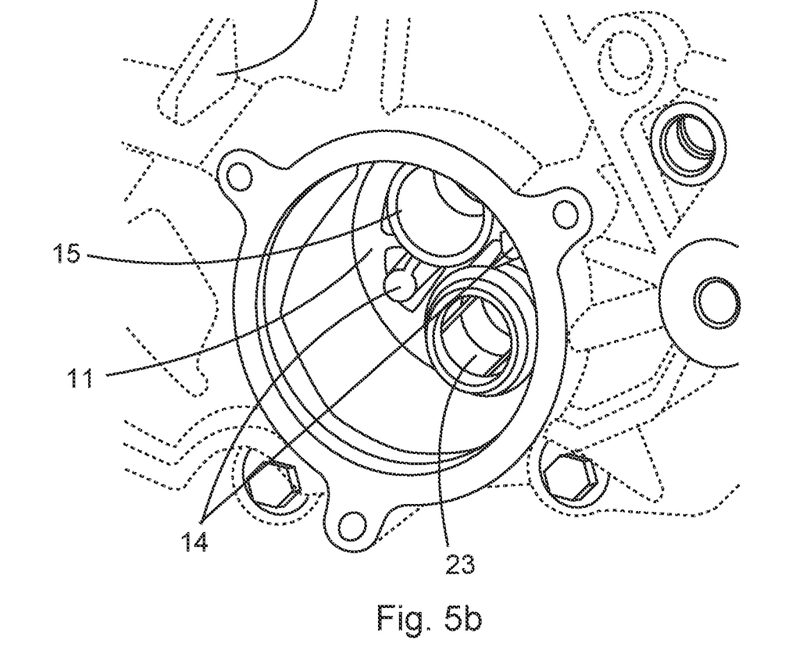
FIG. 5b is a schematic illustration of a first example of a disclosed oil filter arrangement housed in an oil filter arrangement housing.

FIG. 5b shows a schematic illustration of a first example of a disclosed oil filter arrangement housed in an oil filter arrangement housing 32 of a housing 30 of the vehicle, whereby an oil strainer 23 is arranged on a connection unit 11 of an oil filter arrangement and the connection unit 11 comprises two contact pad elements 14.

Figure 5C:
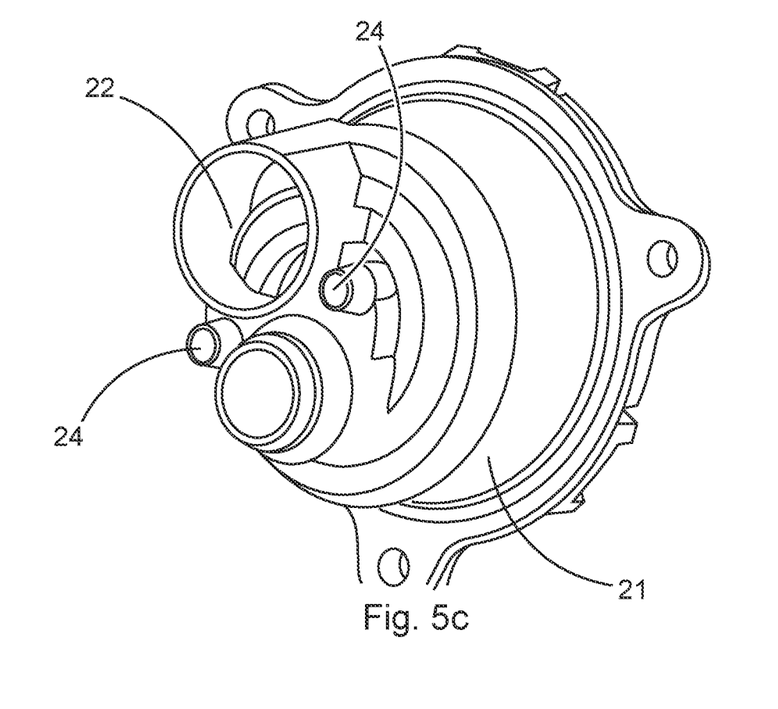
FIG. 5c is a schematic illustration of an example of an oil pump unit.

FIG. 5c shows a schematic illustration of an example of an oil pump unit 21, whereby the oil pump unit 21 can comprise an outlet tube 22 and two contact pad elements 24 of the oil pump unit 21.

Figure 6A:
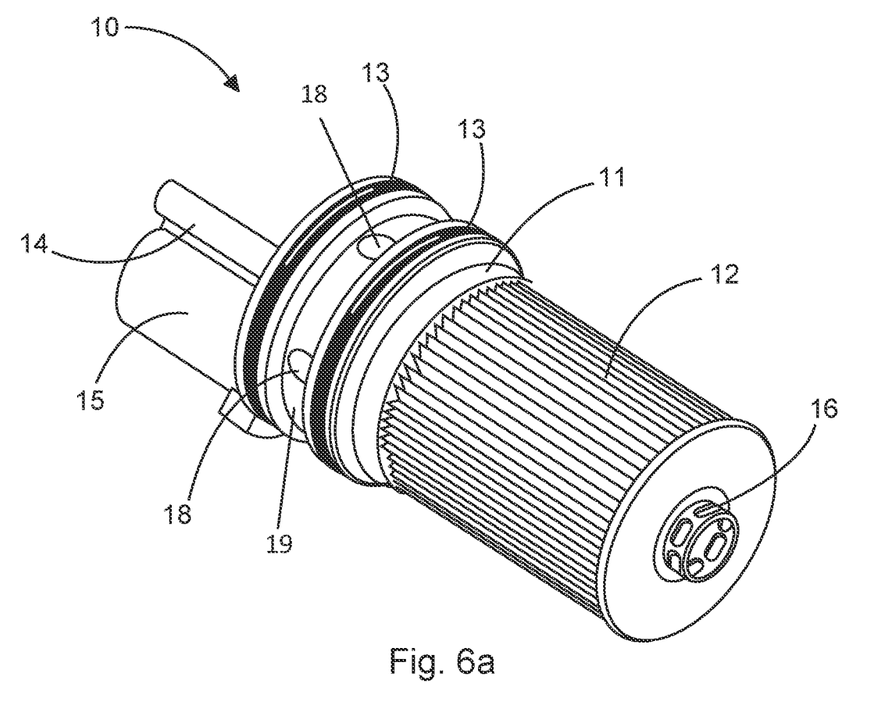
FIG. 6a is a schematic illustration of an example of a disclosed oil filter arrangement according to FIG. 3a and/or 3b.

FIG. 6a shows a schematic illustration of an example of a disclosed oil filter arrangement 10 according to FIG. 3a and/or FIG. 3b, whereby the oil filter arrangement 10 is shown in another view than in FIG. 3a and FIG. 3b.

Figure 6B:
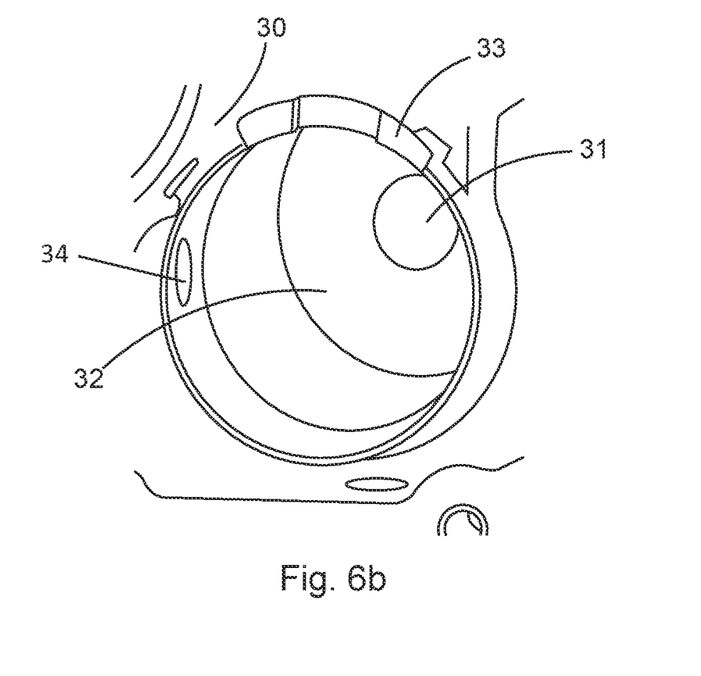
FIG. 6b is a schematic illustration of an example of a disclosed oil filter arrangement housing in a housing of a vehicle.

FIG. 6b shows a schematic illustration of an example of a disclosed oil filter arrangement housing 32 inside a housing 30 of a vehicle, whereby the oil filter arrangement housing 32 comprises a recess 31. The housing 30 further comprises a hole and/or channel 34 and a rotational orientation element of the vehicle 33.

Figure 6C:
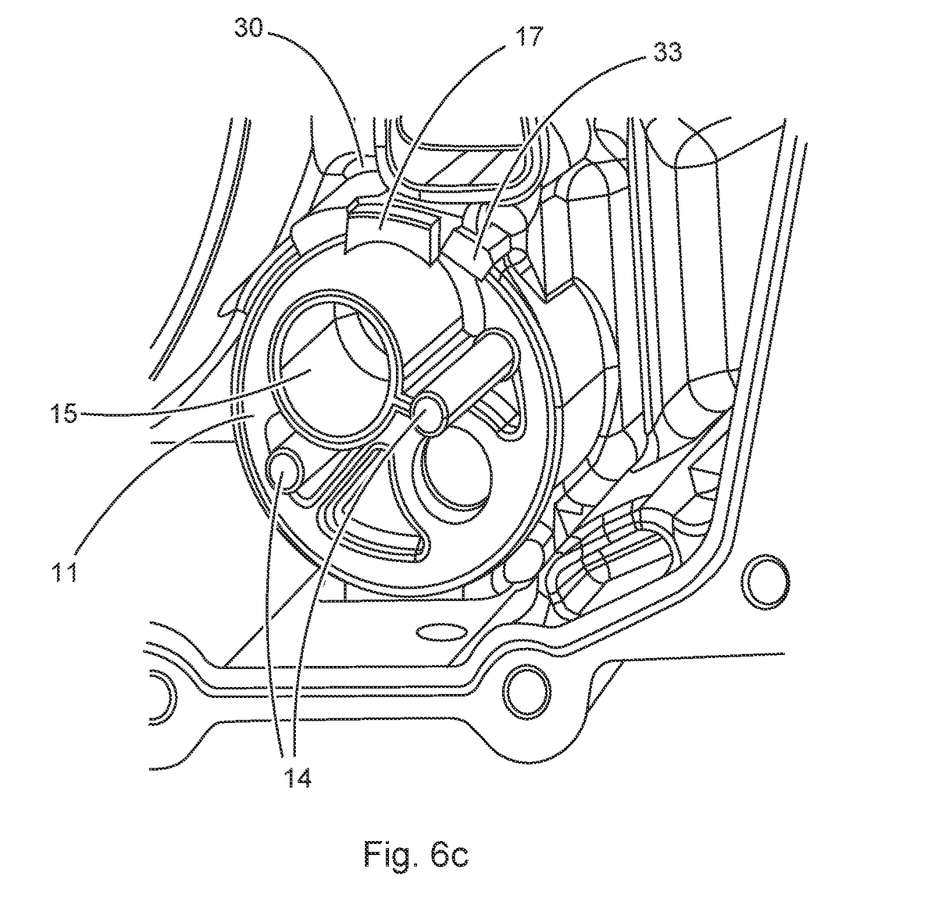
FIG. 6c is a schematic illustration of a second example of a disclosed oil filter arrangement housed in an oil filter arrangement housing of a housing of a vehicle according to FIG. 5b.

FIG. 6c shows a schematic illustration of a second example of a disclosed oil filter arrangement inside an oil filter arrangement housing of a housing 30 according to FIG. 5b, whereby the connection unit 11 comprises a rotational orientation element 17 and the housing 30 comprises a rotational orientation element of the vehicle 33, whereby the rotational orientation element 17 and the rotational orientation element of the vehicle 33 are connected to each other.

Figure 7:
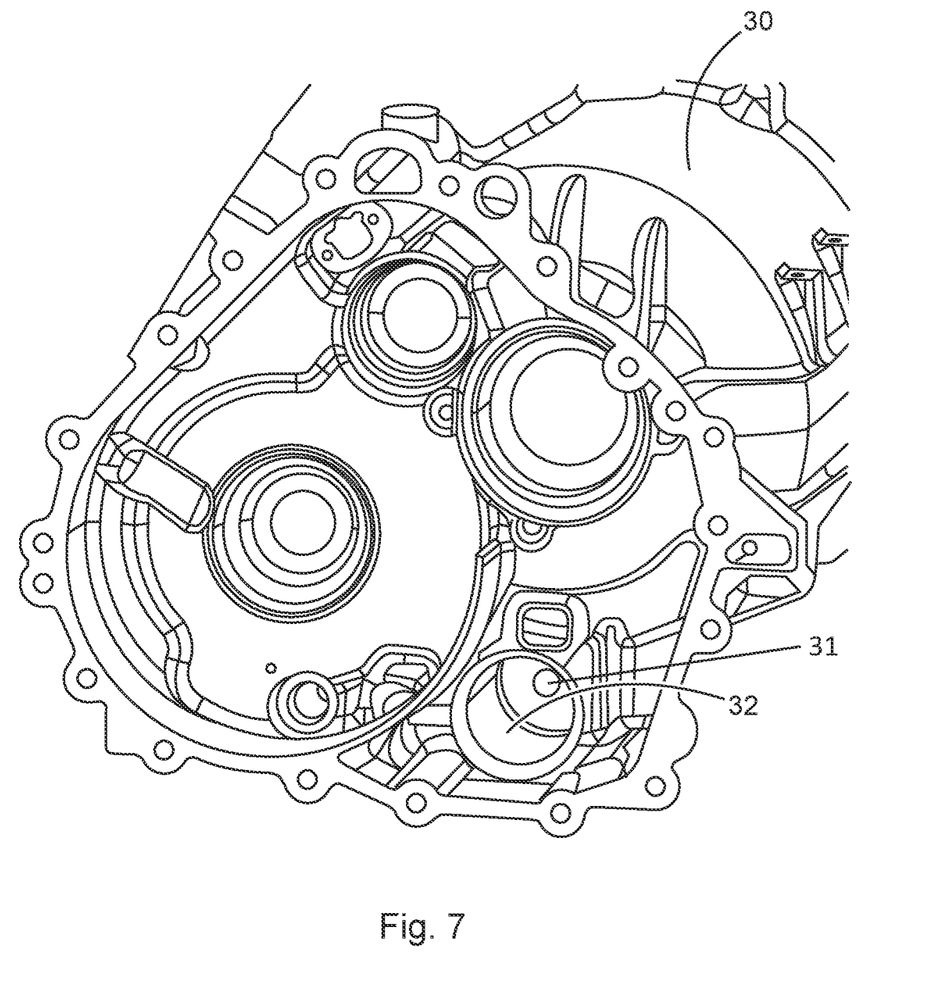
FIG. 7 is a schematic illustration of an example of a housing of a vehicle.

FIG. 7 shows a schematic illustration of an example of a housing 30 of a vehicle, whereby the housing 30 can comprise an oil filter arrangement housing 32 with a recess 31 and the housing is shown as an example of a motor housing.

In other words, the oil filter arrangement is configured to be housed in a hole of a motor housing. The hole in the motor housing can be made at the side where subsequently the transmission housing is supposed to be attached. So, the oil filter arrangement is radially guided in the hole by proper clearance between oil filter arrangement and hole at the area around O-rings and radial grooves. Additionally, the filter is guided at the bottom of the hole in motor housing via a recess made in the motor housing.

Other variations to the disclosed examples can be understood and effected by those skilled in the art in practicing the claimed subject matter, from the study of the figures, the disclosure, and the appended claims. In particular, respective parts/functions of the respective example described above may also be combined with each other. In particular, the present disclosure is not limited to specific modules, vehicle functions, user interfaces, user interface areas/fields and/or communication methods. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS 10 oil filter arrangement
11 connection unit
12 filter unit
13 sealing elements
14 contact pad element
15 tube
16 guiding element
17 rotational orientation element
18 radial hole
19 radial groove
20 oil pump and oil filter arrangement
21 oil pump unit
22 outlet tube
23 oil strainer unit
24 contact element
25 an axle, an engine, or a transmission housing of the vehicle
31 recess
32 oil filter arrangement housing
33 rotational orientation element of the vehicle
34 hole and/or channel
A-A cross section A-A

What is claimed is:

1. An oil filter arrangement for filtering oil of a vehicle, comprising:
   a filter unit for filtering the oil; and
   a connection unit comprising an inlet tube configured to be directly connected with an outlet tube of an oil pump, wherein the filter unit has a first longitudinal axis that is normal to a surface of the connection unit where the filter unit connects to the connection unit, wherein the inlet tube of the connection unit has a second longitudinal axis that is parallel to the first longitudinal axis, and wherein the outlet tube of the oil pump has a third longitudinal axis that is parallel to the first longitudinal axis; and
   wherein the oil filter arrangement is configured to be housed in an oil filter arrangement housing of the vehicle.

2. The oil filter arrangement of claim 1, wherein the connection unit comprises at least one contact element configured to be in contact with at least one contact element of the oil pump.

3. The oil filter arrangement of claim 1, wherein the filter unit comprises at least one guiding element configured to be housed in a recess of the vehicle corresponding to the at least one guiding element.

4. The oil filter arrangement of claim 1, wherein the connection unit comprises a rotational orientation element configured to be connected to a rotational orientation element of the vehicle to restrict a rotation of the oil filter arrangement about a longitudinal axis parallel to the second longitudinal axis.

5. The oil filter arrangement of claim 1, wherein the connection unit comprises at least one radial groove and at least one radial hole configured to transfer the oil from the filter unit to the vehicle.

6. The oil filter arrangement of claim 5, wherein the oil of the vehicle that is pumped by the oil pump from the outlet tube into the inlet tube is transferred from an outside of the filter unit to an inside of the filter unit and from the inside of the filter unit via the at least one radial hole sideways out of the connection unit into the at least one radial groove and the oil filter arrangement housing.

7. The oil filter arrangement of claim 1, wherein the connection unit comprises two or more sealing elements configured to seal a connection between the connection unit and the oil filter arrangement housing of the vehicle.

8. The oil filter arrangement of claim 1, wherein the oil filter arrangement is configured to be fixed in the oil filter arrangement housing using a force-locking connection with the oil pump.

9. The oil filter arrangement of claim 1, wherein the connection unit and the filter unit detachably connect with each other.

10. A system for pumping and filtering oil of a vehicle, comprising:
an oil pump for pumping the oil, comprising:
an outlet tube; and
an oil filter arrangement, comprising:
a filter unit for filtering the oil; and
a connection unit comprising an inlet tube configured to be directly connected with the outlet tube of the oil pump, wherein the filter unit has a first longitudinal axis that is normal to a surface of the connection unit where the filter unit connects to the connection unit, wherein the inlet tube of the connection unit has a second longitudinal axis that is parallel to the first longitudinal axis, and wherein the outlet tube of the oil pump has a third longitudinal axis that is parallel to the first longitudinal axis, and
wherein the oil filter arrangement and the oil pump are directly connected to each other to transfer the oil between the oil pump and the oil filter arrangement at least from the outlet tube to the inlet tube, and
wherein the oil pump and the oil filter arrangement are configured to be housed in the oil filter arrangement housing of the vehicle.

11. The system of claim 10, wherein the oil pump and the oil filter arrangement comprise an oil strainer unit configured to filter the oil transferred between the vehicle and the oil pump.

12. The system of claim 10, wherein the oil pump comprises at least one contact element configured to be in contact with at least one contact element of the oil filter arrangement.

13. The system of claim 10, wherein the connection unit comprises at least one contact element configured to be in contact with at least one contact element of the oil pump.

14. The system of claim 10, wherein the filter unit comprises at least one guiding element configured to be housed in a recess of the vehicle corresponding to the at least one guiding element.

15. The system of claim 10, wherein the connection unit comprises a rotational orientation element configured to be connected to a rotational orientation element of the vehicle to restrict a rotation of the oil filter arrangement about a longitudinal axis parallel to the second longitudinal axis.

16. The system of claim 10, wherein the connection unit comprises at least one radial groove and at least one radial hole configured to transfer the oil from the filter unit to the vehicle.

17. The system of claim 10, wherein the connection unit comprises two or more sealing elements configured to seal a connection between the connection unit and the oil filter arrangement housing of the vehicle.

18. A vehicle, comprising:
an oil pump for pumping oil, comprising:
an outlet tube; and
an oil filter arrangement, comprising:
a filter unit for filtering the oil; and
a connection unit comprising an inlet tube configured to be directly connected with the outlet tube of the oil pump, wherein the filter unit has a first longitudinal axis that is normal to a surface of the connection unit where the filter unit connects to the connection unit, wherein the inlet tube of the connection unit has a second longitudinal axis that is parallel to the first longitudinal axis, and wherein the outlet tube of the oil pump has a third longitudinal axis that is parallel to the first longitudinal axis, and
wherein the oil filter arrangement is configured to be housed in an oil filter arrangement housing of the vehicle;
wherein the oil filter arrangement and the oil pump unit are connected to each other to transfer the oil between the oil pump unit and the oil filter arrangement at least from the outlet tube to the inlet tube.

19. The vehicle of claim 18, wherein the oil filter arrangement housing is provided in an axle, an engine, or a transmission housing of the vehicle.

20. The vehicle of claim 18, wherein the connection unit comprises at least one contact element configured to be in contact with at least one contact element of the oil pump.

* * * * *